(12) United States Patent
Pau et al.

(10) Patent No.: US 8,866,997 B2
(45) Date of Patent: Oct. 21, 2014

(54) PATTERNED ELECTRONIC AND POLARIZATION OPTICAL DEVICES

(75) Inventors: Stanley Pau, Tucson, AZ (US); Arshad S. Sayyad, Tucson, AZ (US); Graham B. Myhre, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 109 days.

(21) Appl. No.: 13/287,910

(22) Filed: Nov. 2, 2011

(65) Prior Publication Data
US 2012/0105783 A1     May 3, 2012

Related U.S. Application Data

(60) Provisional application No. 61/456,184, filed on Nov. 2, 2010, provisional application No. 61/516,621, filed on Apr. 5, 2011.

(51) Int. Cl.
| | | |
|---|---|---|
| *G02F 1/1333* | (2006.01) | |
| *C09K 19/38* | (2006.01) | |
| *G02F 1/1337* | (2006.01) | |
| *C09K 19/56* | (2006.01) | |

(52) U.S. Cl.
CPC .......... *C09K 19/38* (2013.01); *G02F 1/133703* (2013.01); *C09K 19/56* (2013.01); *G02F 1/133788* (2013.01)
USPC ............. 349/88; 349/127; 349/163; 349/135; 349/93; 349/94

(58) Field of Classification Search
CPC .................. H01L 2224/48091; G02F 1/13725
USPC ........................ 349/135, 127, 163; 359/75, 98
See application file for complete search history.

(56) References Cited

U.S. PATENT DOCUMENTS

| | | | |
|---|---|---|---|
| 3,971,065 A | | 7/1976 | Bayer |
| 4,208,106 A | * | 6/1980 | Oh ................................ 349/164 |
| 4,832,462 A | * | 5/1989 | Clark et al. ................... 349/134 |
| 4,838,662 A | * | 6/1989 | Hilsum et al. ................ 349/164 |
| 5,389,698 A | | 2/1995 | Chigrinov et al. |
| 5,602,661 A | * | 2/1997 | Schadt et al. ................. 349/124 |

(Continued)

FOREIGN PATENT DOCUMENTS

WO    WO 2004087795 A1 * 10/2004 ................. C08J 5/18

OTHER PUBLICATIONS

Zanchetta et al., "Right-handed double-helix ultrashort DNA yields chiral nematic phases with both right- and left-handed director twist," PNAS 107-41:17497-17502 (Oct. 12, 2010).

(Continued)

*Primary Examiner* — Edward Glick
*Assistant Examiner* — Sang V Nguyen
(74) *Attorney, Agent, or Firm* — Klarquist Sparkman, LLP

(57) ABSTRACT

Linear photo-oriented polymer (LPP) layers are situated to align liquid crystals in a liquid crystal polymer (LCP) layer situated at or on the LPP layers. The LCP layer can include a guest such as a fluorophore that aligns with the liquid crystal so as to emit polarized fluorescence in response to an excitation beam. Layer LPP/LCP structures can be provided as light emitters, patterned polarizers, patterned retarders and other devices based on selection of one or more guest materials included in the LCP and alignable with the liquid crystal.

42 Claims, 8 Drawing Sheets

(56) References Cited

U.S. PATENT DOCUMENTS

| | | | |
|---|---|---|---|
| 6,496,239 B2 | 12/2002 | Seiberle | |
| 6,624,863 B1* | 9/2003 | Jacobs et al. | 349/126 |
| 6,783,900 B2 | 8/2004 | Venkataraman | |
| 7,009,190 B1* | 3/2006 | Stephenson et al. | 250/504 R |
| 7,230,717 B2* | 6/2007 | Brock et al. | 356/495 |
| 8,186,573 B2* | 5/2012 | Callegari et al. | 235/375 |
| 2002/0163616 A1* | 11/2002 | Jones et al. | 349/187 |
| 2004/0212296 A1* | 10/2004 | Nakamura et al. | 313/504 |
| 2006/0092370 A1* | 5/2006 | Lu | 349/183 |
| 2006/0226421 A1* | 10/2006 | Fujiwara et al. | 257/40 |
| 2007/0248840 A1* | 10/2007 | Lin et al. | 428/690 |
| 2008/0001120 A1* | 1/2008 | Peglow et al. | 252/299.1 |
| 2009/0142476 A1* | 6/2009 | Padiyath et al. | 427/66 |
| 2010/0060844 A1* | 3/2010 | Sawatari et al. | 349/187 |
| 2010/0141881 A1* | 6/2010 | Batistatos et al. | 349/124 |
| 2011/0007255 A1* | 1/2011 | Yaroshchuk et al. | 349/123 |
| 2011/0017838 A1* | 1/2011 | Delbaere et al. | 235/494 |
| 2011/0101848 A1* | 5/2011 | Cormier et al. | 313/483 |
| 2011/0299001 A1* | 12/2011 | Banin et al. | 349/33 |

OTHER PUBLICATIONS

Zanchetta et al., "Physical Polymerization and Liquid Crystallization of RNA Oligomers," J. Am. Chem. Soc. 130:12864-12865 (2008).

Myhre et al., "Imaging Capability of Patterned Liquid Crystals," Applied Optics 48(32):6152-6158 (2009).

Myhre et al., "Patterned Color Liquid Crystal Polymer Polarizers," Optics Express 18(26):27777-27786 (2010).

* cited by examiner

| $404_{11}$ | | | | $404_{15}$ |
|---|---|---|---|---|
| $404_{21}$ | | | | |
| $404_{31}$ | | | | |
| $404_{41}$ | | | | $404_{45}$ |

US 8,866,997 B2

PATTERNED ELECTRONIC AND POLARIZATION OPTICAL DEVICES

CROSS REFERENCE TO RELATED APPLICATIONS

This application claims the benefit of U.S. Provisional Patent Applications 61/456,184, filed Nov. 2, 2010 and 61/516,621, filed Apr. 5, 2011, both of which are incorporated herein by reference.

ACKNOWLEDGMENT OF GOVERNMENT SUPPORT

This invention was made with government support under contract FA9550-09-1-0669 awarded by the United States Air Force Office of Scientific Research. The government has certain rights in the invention.

FIELD

The disclosure pertains to patterned optical devices such as polarizers, retardation plates, and oriented light emitters.

BACKGROUND

Photopolymers having molecular orientations that can be established by exposure to irradiation with linearly polarized ultraviolet light have been developed for use in aligning liquid crystal layers. For example, Chigrinov et al., U.S. Pat. No. 5,389,698, discloses orientable polymers based on polyvinyl cinnamate that can be used as optical retarders or liquid crystal alignment layers. Schadt et al., U.S. Pat. No. 5,602,661, discloses using photo-orientable polymer networks (PPNs) with certain cross-linked liquid crystal monomers to provide a fixed, structured orientation. Schadt also discloses liquid crystal materials consisting of mixtures of liquid crystal monomers and functional dichroic chromophores. Polarization masks for transfer of polarization patterns to PPN layers are disclosed by Seiberle, U.S. Pat. No. 6,496,239. The above patents provide additional details of conventional aspects of device structures, fabrication methods, and materials, and are incorporated herein in their entireties to provide at least this additional information.

While PPN materials have been described and structures based on such materials are described in the above-cited patents, the application of PPN materials for other purposes has heretofore been unappreciated. Novel and non-obvious uses and applications are disclosed below.

SUMMARY

In some examples, methods comprise providing an alignment layer for liquid crystal alignment, wherein the alignment layer defines at least one alignment direction. A liquid crystal polymer layer is formed proximate the alignment layer so that the liquid crystal of the liquid crystal polymer layer is aligned with respect to at least one alignment direction, wherein the liquid crystal polymer includes at least one guest material that aligns with the liquid crystal. The guest material is typically one or more of a fluorescent dye, an organic semiconductor, anisotropic nanocrystals, or carbon nanotubes. In some examples, the alignment layer is a rubbed polyimide layer or a photo-orientable polymer network (PPN) layer. In some embodiments, the PPN layer is patterned so as to provide at least two alignment directions. In other examples, the liquid crystal polymer comprises a plurality of fluorescent dyes selected to a provide color neutral fluorescence. Typically, at least one alignment direction is established by exposing the PPN to linearly polarized ultraviolet radiation, and patterning the PPN layer comprises exposing the PPN layer to patterned linearly polarized ultraviolet radiation. According to some examples, the patterned linearly polarized ultraviolet radiation is defined by a lithographic mask that includes an oriented liquid crystal polymer layer so that incident linearly polarized ultraviolet (LPUV) radiation is patterned to include one or more linear states of polarization. In other examples, the PPN layer is patterned by exposure to patterned linearly polarized ultraviolet radiation provided by one or more lithographic masks such as chrome masks. In some cases, the state of polarization of the incident LPUV radiation and the PPN layer are rotated with respect to each other for one or more exposures. Portions of the PPN layer that are not exposed to the patterned linearly polarized ultraviolet radiation are removed.

Representative devices comprise an alignment layer defining at least one alignment direction and a liquid-crystal polymer (LCP) layer proximate the alignment layer such that the liquid crystal of the liquid-crystal alignment layer is aligned with respect to the at least one alignment direction. Fluorophores are situated in the LCP layer so as to align with respect to the liquid crystal and the alignment layer in an oriented photo-orientable polymer network (PPN). In some embodiments, the alignment layer defines a plurality of spatially varying alignment directions. In additional examples, an ultraviolet radiation source is configured to irradiate the fluorophores. In yet other examples, the alignment layer is situated at a substrate that can be a flexible or rigid. In further examples, the substrate is a silicon wafer having at least one electronic device formed thereon.

Methods comprise providing a liquid-crystal polymer layer having at least one liquid-crystal orientation direction, wherein the liquid-crystal polymer layer includes a plurality of oriented fluorophores. The fluorescent layer is exposed to irradiation from an excitation light source selected to excite fluorescence in the fluorophores so as to produce polarized fluorescence. In some examples, the liquid-crystal orientation direction is based on an alignment direction established by an oriented photo-orientable polymer network (PPN).

Representative devices comprise an alignment layer that defines at least one alignment direction, and a liquid-crystal polymer layer adjacent the alignment layer and containing carbon nanotubes (CNTs), such that the CNTs are aligned with respect to the at least one alignment direction. In some examples, the alignment layer is an oriented photo-orientable polymer network (PPN) layer patterned to provide a plurality of alignment directions.

Optical devices comprise a first layer pair that includes an oriented photo-orientable polymer network (PPN) alignment layer and a liquid-crystal layer situated so as to align with respect to the PPN alignment layer, the liquid-crystal layer including a guest material. A second layer pair includes an oriented photo-orientable polymer network (PPN) alignment layer and a liquid-crystal layer situated so as to align with respect to the PPN alignment layer. A barrier layer is situated to separate the first and second layer pairs. In some embodiments, the guest material of the first layer pair is a dichroic dye, and the second layer pair is configured to foam an optical retarder having an orientation at 45 degrees with respect to the alignment of the dichroic dye. In a particular example, the optical retarder is a quarter-wave retarder. In further examples, at least a third layer pair is provided that includes an oriented photo-orientable polymer network (PPN) alignment layer and a liquid-crystal layer situated so as to align with respect to the PPN alignment layer, the liquid-crystal layer including a guest material.

The foregoing aspects of the disclosed technology will become more apparent from the following detailed description, which proceeds with reference to the accompanying figures.

DETAILED DESCRIPTION

Figure 1:
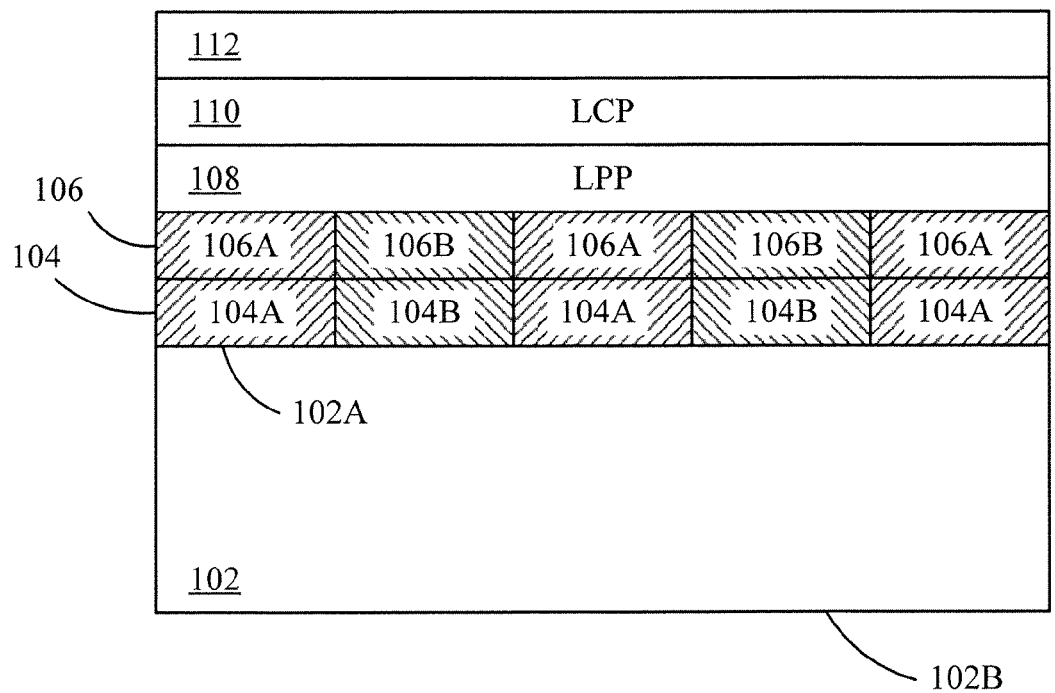
FIG. 1 is a sectional view of a representative liquid-crystal polymer (LCP)-based patterned device.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Patterned and oriented arrangements of anisotropic molecules or micro/nanocrystals on a large area substrate have many applications in optical and electronic devices. One alignment technique is based on photo-oriented polymer networks (PPN) that can be used as an alignment layer in a liquid-crystal guest-host system. In this technique, the PPN is aligned and patterned using polarized ultraviolet light lithography on a substrate as described in U.S. Pat. Nos. 5,389,698 and 6,496,239. A layer of a liquid crystal in a polymer (LCP) is coated on top of an aligned PPN so as to align with the PPN. The LCP can be mixed with functionalized dichroic chromophores, but for this technique to be successful, the chromophores (referred to as the "guest") must be soluble in the liquid-crystal polymer (referred to as the "host"). Phase separation between the guest and the host will prevent uniform alignment. In addition, the chromophores must align to the host system in a predetermined way. The solubility and orientability of the guest-host system depend on the chemistry of the solvent, the liquid crystal, and the chromophores. In certain embodiment, the dichroic chromophore and/or semiconductor polymer may exhibit a liquid-crystal phase and can form a polymer film with addition of photo-initiator and monomer. In this case, the liquid-crystal phase, consisting primarily of the dichroic chromophore and/or semiconductor polymer, acts as both the "guest" and the "host" and can be coated on top of an aligned PPN so as to align with the PPN.

Disclosed herein are unique guest-host chemical systems which provide good solubility and orientability of the guest in the host, and novel devices that can use such chemical systems or other chemical systems. In addition, while novel dichroic dyes (chromophores) are disclosed that can serve as guests, other technologically important classes of materials, such as carbon nanotubes (CNT), n- and p-type semiconductor polymers, dichroic fluorophores and fluorescent proteins are disclosed as well. Proteins such as enzymes and nucleic acids such as deoxyribonucleic acid (DNA) and ribonucleic acid (RNA) can be patterned using the mentioned techniques. Both DNA and RNA have been shown to exhibit liquid-crystal phase and birefringent optical properties. See, for example, Zanchetta et al., "Right-Handed Double-Helix Ultrashort DNA Yields Chiral Nematic Phases with Both Right- and Left-Handed Director Twist," PNAS 107:17497-17502 (2010, and Zanchetta et al., "Physical Polymerization and Liquid Crystallization of RNA Oligomers," JACS Communications 130:12864-12865 (2008), both of which are incorporated herein by reference. According to representative fabrication methods set forth below, a PPN and a guest-host system in polymer mixture can be deposited on arrays of CCD and CMOS image sensors. In addition, in some examples, multiple layers of a guest-host system are provided on a single substrate to form structures that can require two or more guest layers, such as a circular polarizer that can be formed as a dichroic dye guest-host layer and a quarter wave retarder layer. The disclosed devices and methods are described below with reference to generic devices, structures, and methods, followed by numerous specific examples.

LCPs are also referred to herein as "reactive mesogens," and generally are based on liquid-crystal materials having one or more polymerizable groups such as acrylates. Such materials can be polymerized into films, typically by exposure to UV radiation. The LC structure is then fixed by the polymerization. Such LCP layers can be applied to rigid or deformable substrates, such as glass, plastics, metal foils, or other surfaces. PPNs are also referred to herein as linear photo-polymerizable polymers (LPPs). In some examples, fluorescent materials are aligned in an LCP layer so as to emit light in a selected state of polarization. Such fluorescent materials are referred to herein generically as fluorophores. For convenient illustration, embodiments based on the uses of fluorescent dyes as fluorophores are described.

A PPN layer that includes one or more orientation directions established by single or multiple exposures to polarized ultraviolet radiation is referred to herein as an oriented or aligned PPN layer. In some examples, alignment of an LCP layer with respect to an oriented PPN layer can be accomplished even with one or more intervening layers, and contact of the two layers is not required.

In some examples, polarized light emission can be produced based on fluorescence or other effects. As used herein, polarized emission refers to emission such that a ratio of optical power in at least one state of polarization to total emitted power is at least 0.5, 0.6, 0.7, 0.8, 0.9, or more. In typical examples, optical devices are produced for use as visible optical wavelengths between about 400 nm and 700 nm, but devices for longer or shorter wavelengths can also be provided.

Representative Devices

A typical LCF-based patterned device is illustrated in FIG. 1. A substrate 102 having planar surfaces 102A, 102B is coated with an LPP layer 104 at the surface 102A. The substrate 102 can be glass, fused silica, silicon, germanium, or any other material as may be suited for a particular application. For example, some applications may require high transmission of visible light, so that optically transparent substrates are used. Alternatively, conducting substrates, or light-absorbing or light-blocking substrates can be used. Although not shown in FIG. 1, the substrate 102 can be provided with other coatings or surface treatments so that the LPP layer 104 is situated on these coatings or surface treatments. For example, the surface 102A can be provided with a conductive coating such a metallic coating, or a transparent conductive coating such as an indium tin oxide (ITO) coating. The LPP 104 can be patterned by exposure to linear polarized light in one or more orientations through one or more masks, so that the LPP layer 104 has a spatially varying orientation that is suitable to provide alignment of a liquid-crystal material in a liquid-crystal polymer in an LCP layer 106. The LCP layer 106 generally includes, in addition to the liquid-crystal material which serves as a "host" material, a "guest" material such as a dichroic dye, a fluorescent dye or other fluorophores, an organic semiconductor, carbon nanotubes, or other material configured to align with the liquid-crystal material with respect to the spatially varying orientation in the LPP layer 104. As shown in FIG. 1, the LPP layer 104 defines pluralities of regions 104A, 104B having differing alignments, generally due to exposure to differing linear polarizations of UV radiation. The LCP layer has corresponding alignment regions 106A, 106B. As shown in FIG. 1, alignments in the regions 106A, 106B are mutually orthogonal, but other alignments are possible.

While many applications can be addressed with a single guest-host layer such as the LPP layer 104, additional guest-host layers can be provided, with or without additional LPP alignment layers. As shown in FIG. 1, an additional LPP layer 108 is situated on the LCP layer 106, and an additional LCP layer 110 is provided so as to align with directions established by the LPP layer 108. The LPP layers 104, 108 can be processed to provide differing patterns. The LPP layer 108 can be omitted, and the LCP layer 110 aligns in response to alignment directions established by the LPP layer 104. The LCP layer 110 can include the same or a different guest material as the LCP layer 106, or no guest material at all. For example, the LCP layer 110 can be configured to serve as an optical retarder, and the LCP layer 106 configured to provide a suitable retardance based on a layer thickness. Additional LCP layers (and LPP layers) can be provided, and additional layers such as metallic, semiconductor, or barrier layers situated so as to separate LCP and/or LPP layers. A second substrate 112 can also be provided, and, if desired, an alignment layer such as an orientated LPP layer or a conventional rubbed polyimide layer can be provided at a surface of the second substrate 112. In the example of FIG. 1, the LPP layer 108 provides a uniform orientation, and the LCP layer 110 thus has common alignment. The LCP layer 110 can be provided with various guest materials such as fluorophores, carbon nanotubes, or other materials. Each of the LCP layers 106, 110 can include the same or different guest materials, or no guest material at all. Typically, LPP and LCP layers exhibit birefringence, and optical retarders with spatially varying optical axes can be formed without using a guest material in the LCP layer.

Figure 2A:
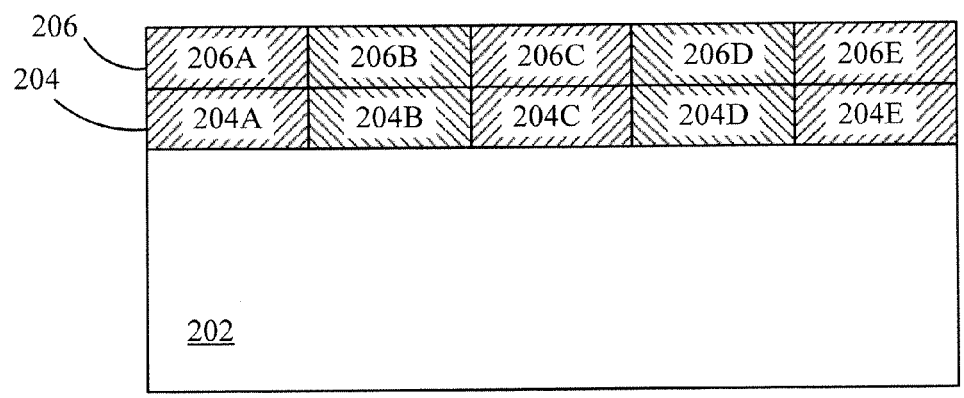
FIGS. 2A-2B are plan and sectional views, respectively, of a representative patterned photo-oriented polymer network (PPN)/LCP device having pattern elements arranged in rows and columns.
Figure 2B:
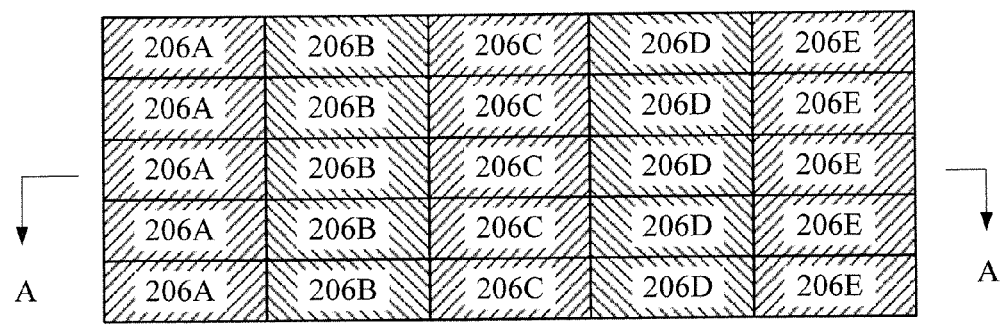

A representative single-layer device 200 is illustrated in FIGS. 2A-2B. A substrate 202 is provided with an LPP alignment layer 204 and an LCP layer 206. The LPP layer 204 includes a 5-row-by-5-column array of representative pattern areas that produce LCP areas 206A-206E each of which can have a different alignment. More or fewer pattern areas can be provided, and a 5×5 array is selected for convenient illustration. In some examples, all pattern elements in a row or column are the same, and adjacent rows or columns having different alignments, or alternating or other arrangements, are used. The LCP layer 206 can include one or more guest materials such as one or more fluorophores, dichroic dyes, carbon nanotubes, organic semiconductors, or other guest materials. The LPP layer 204 has corresponding alignment areas 204A-204E for alignment of the LCP areas 206A-206E.

Representative Methods

Figure 3:
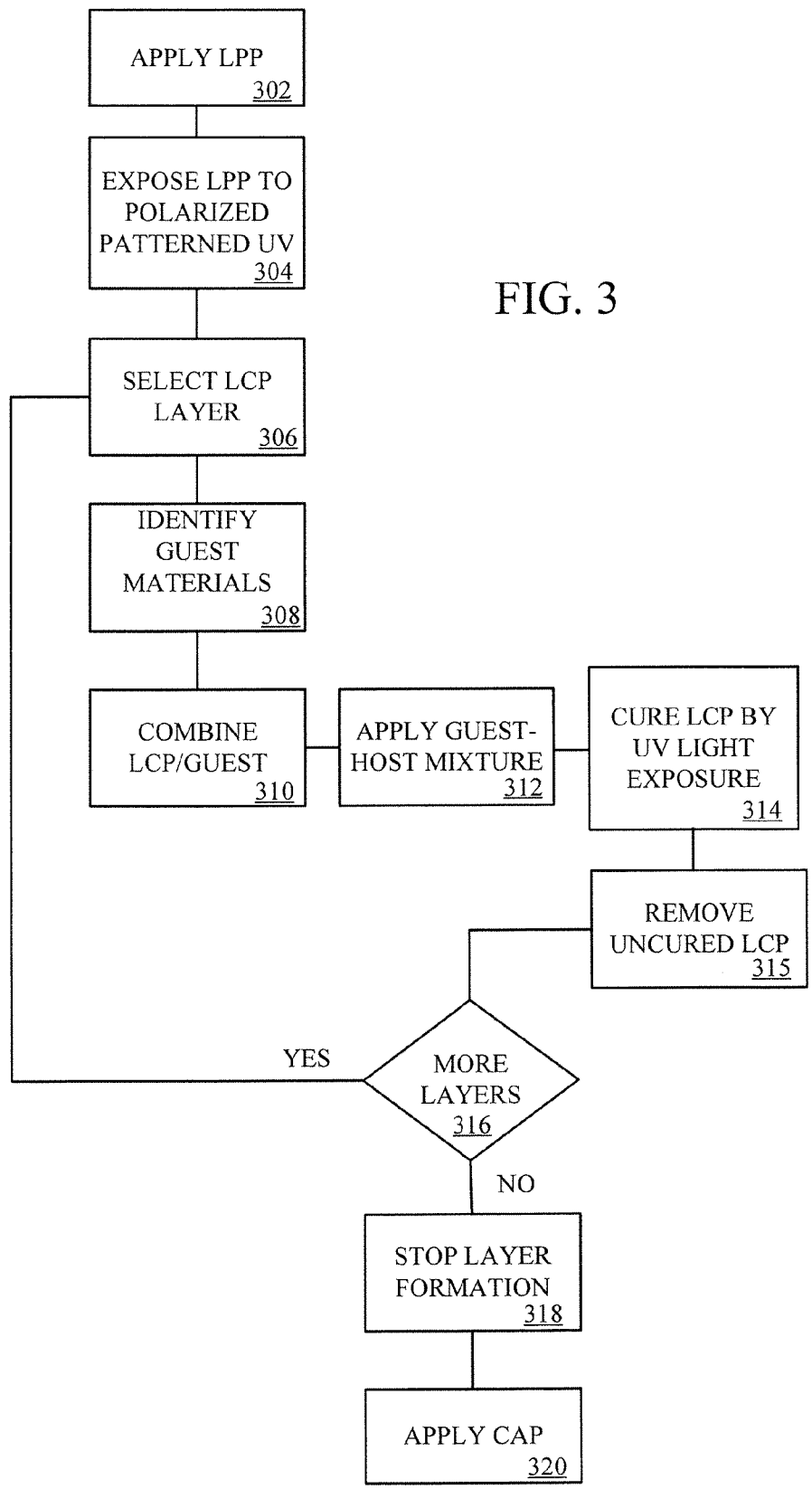
FIG. 3 is a block diagram of a representative fabrication method for linear polarizable polymer (LPP)/LCP devices.

A representative fabrication method is illustrated in FIG. 3. At 302, an LPP layer is applied to a substrate by spin-coating or other processes. For a non-flat surface, a planarization layer may first be used to planarize the substrate. At 304, the LPP layer is exposed to patterned linearly polarized light, typically by situating a patterned chrome-on-quartz mask proximate the LPP layer, or by projecting patterned ultraviolet light produced by a mask onto the LPP layer. The mask can include a plurality of transmissive apertures (i.e., apertures lacking a chrome coating). In some examples, some transmissive apertures are also provided with a λ/2 retarder layer so as to rotate an incident UV state of polarization so that the LPP layer can be provided with various alignments. Alternatively a series of exposures can be made with different LPP layer/UV polarization orientations.

An LCP material is selected at 306, and one or more suitable guest materials are identified at 308. Guest materials generally must have appreciable solubility, typically in range of 1 to 1050 mg/ml in the selected LCP, and selected material should continue to serve the function for which it was selected after combination with the LCP. Materials that lack solubility typically cannot be included in sufficient quantity in the LCP layer to produce the intended type of device. Some guest fluorophore materials have substantially reduced quantum efficiency due to quenching or other processes when introduced into an LCP layer. A selected guest material is combined with the LCP material at 310, and at 312 the mixture is coated onto the LPP layer by spinning or other processes. At 314, the LCP layer is cured by exposure to ultraviolet radiation. Regions that are not completely cured can be subsequently removed by solvent at 315. At 316, additional layers can be selected, and layer selection and formation continues at 302. Additional layers of LCP and/or LPP can be applied in the same way, with differing patterns and differing guest materials. If all layers have been formed, at 318, LPP/LCP layer formation stops. At 320, a cap substrate such as a glass or fused silica substrate is applied, typically with an ultraviolet curable optical adhesive so that the LPP and LCP layers are substantially enclosed except at layer edges. While LPP layers can provide more reproducible, readily patterned LC alignment than conventional rubbed alignment layers (for example, polyimide layers), such rubbed layers can be included as well, particularly if patterning of the alignment layer is not likely to be required.

Figure 8:
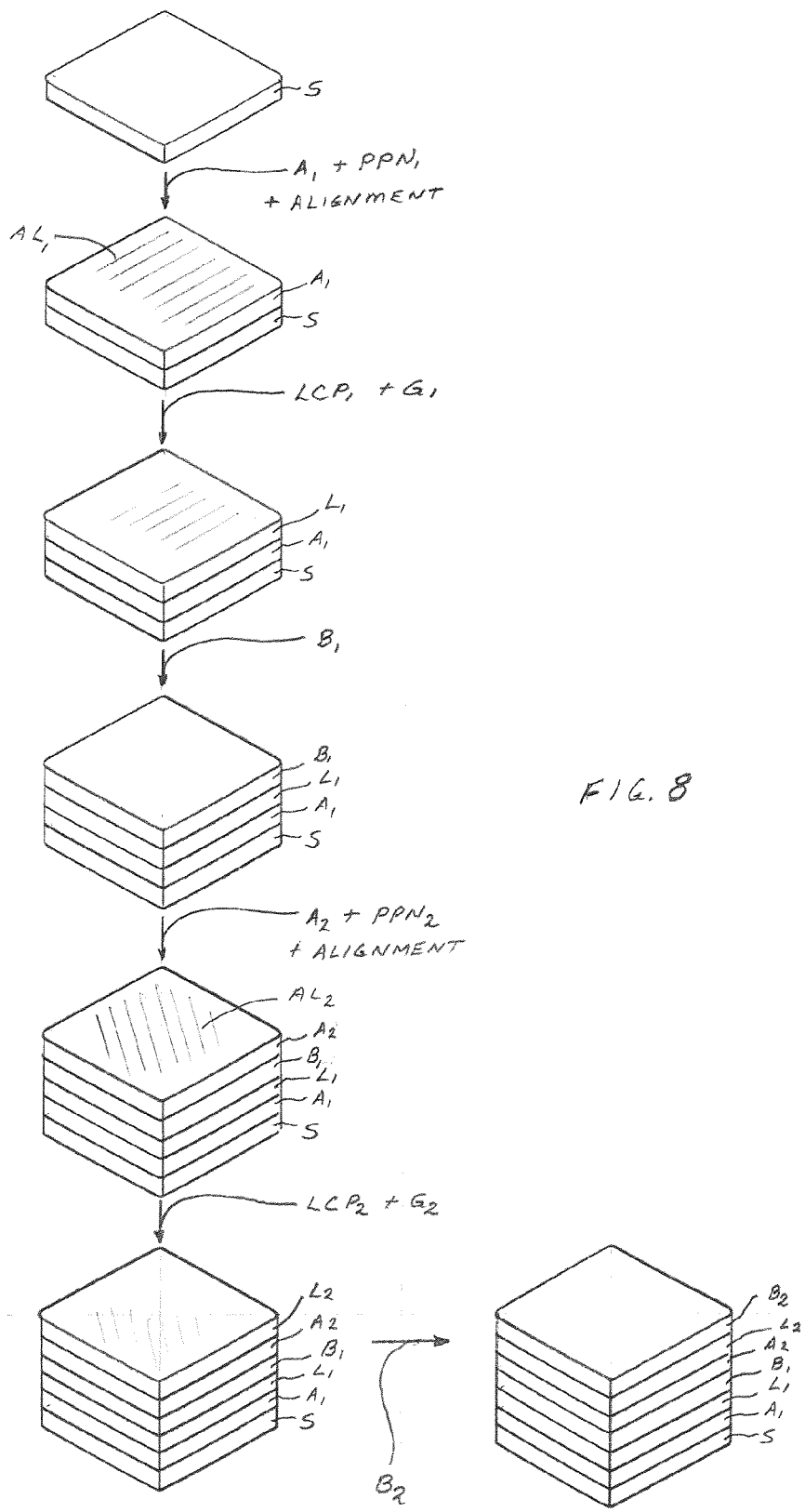
FIG. 8 is a schematic depiction of steps in a representative method for forming a device having a substrate, first and second alignment layers, first and second liquid crystal polymer (LCP) layers, and first and second barrier layers.

Formation of a device having multiple groups of layers is schematically depicted in FIG. 8. Applied to the surface of a substrate S is a first alignment layer $A_1$ (which includes a corresponding $PPN_1$). Forming the first alignment layer $A_1$ includes aligning the PPNs of the layer according to a first orientation $AL_1$. A first liquid crystal polymer layer $L_1$ (with guest $G_1$) is formed superposedly relative to the first alignment layer $A_1$ so that the liquid crystal polymer molecules $LCP_1$ (and guest material $G_1$) can be aligned according to the first orientation $AL_1$. A first barrier layer $B_1$ is then formed. A second alignment layer $A_2$ is formed (including the corresponding $PPN_2$) by applying the $PPN_2$ and aligning them according to a second orientation $AL_2$. A second liquid crystal polymer layer L2 (with guest $G_2$) is formed superposedly to the second alignment layer $A_2$, and the polymers are caused to become coaligned according to the second pattern $AL_2$. A second barrier layer $B_2$ is then applied to, inter alia, protect the underlying layers.

Although FIG. 8 shows the layers $A_1$, $A_2$ as being continuous, it will be understood that these layers (and/or their respective liquid crystal polymer layers $L_1$, $L_2$) can be formed according to respective patterns, e.g., to form a sensor array. It will also be understood that the depicted layers can include one or more intervening layers.

Figure 9:
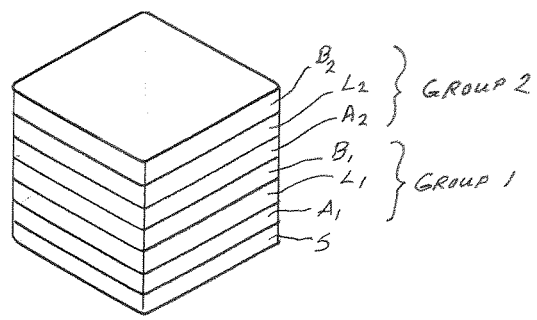
FIG. 9 is a schematic depiction of a region of a device having two groups of polarization layers.

FIG. 9 is a schematic view of a representative structure that can be formed by the method shown schematically in FIG. 8. Note that the layers $A_1$, $L_1$, $B_1$ comprise a first group of polarization layers, and the layers $A_2$, $L_2$, $B_2$ comprise a second group of polarization layers, both groups being supported by a substrate S. In this structure, each group includes its own barrier layer.

Example 1

Micropolarizer on a Sensor Array

Figures 4A, 4B:
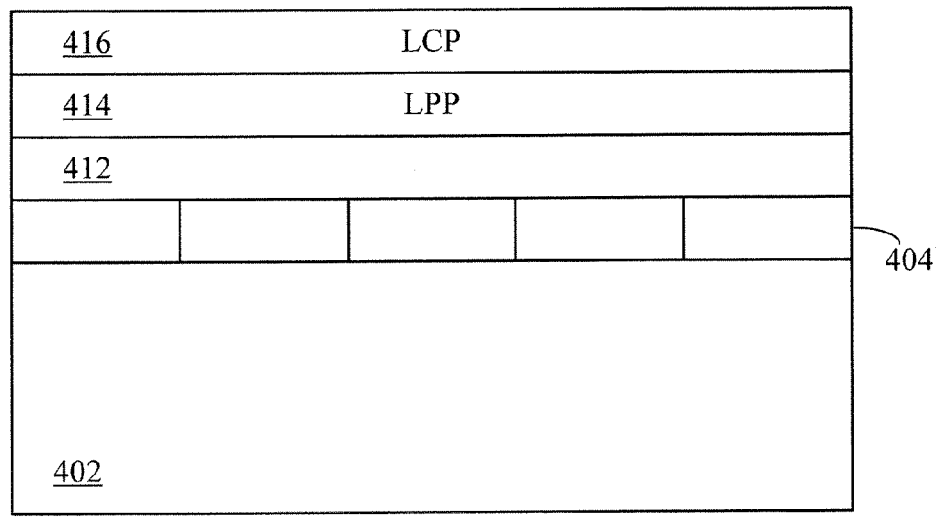
FIGS. 4A-4B are sectional and plan views of a CCD image sensor with a patterned LPP/LCP polarizer.

A micropolarizer array can be fabricated directly on an imaging sensor, such as a charge-coupled device (CCD) or complementary metal-oxide-semiconductor (CMOS) sensor, or a display-device, such as a liquid-crystal display (LCD), organic light emitting diode (OLED) display, or plasma display. A representative device is illustrated in FIG. 4. A CCD 402 includes an array 404 of pixels $404_{I,J}$, wherein I, J are integers that refer to row and column number, respectively, associated with a selected pixel. For color image sensors, the pixels $404_{I,J}$ can include two or more color elements, and typically each of the pixels $404_{I,J}$ includes four color elements, wherein at least one of which is associated with red (R), green (B), and blue (B) color filters. As used herein, a pixel refers to either a collection of sensor elements arranged to produce a color representation at a selected image location, or a single sensor element that can be part of such a collection of sensor elements. Image sensors and arrangements of color filters for such sensors are described in U.S. Pat. No. 3,971,065, U.S. Pat. No. 6,783,900, and Dillon et al., IEEE Trans. Electron Devices 25:97 (1978), all of which are incorporated herein by reference.

The image sensor 402 can include a planar or other exterior surface that can be provided with a passivation or protective coating 412 such as a light-transmissive insulator such as BPSG, PSG, silicon dioxide, silicon nitride, polyimide, or other known material. A PPN layer 414 is situated on the passivation layer 412. The PPN layer 414 is patterned by exposure to one or more polarized UV beams with one or more masks so as to define PPN orientation directions that can vary from pixel to pixel (including from color element to color element in a color image sensor). An LCP layer 416 that includes a dichroic dye (and/or other guest materials) is situated on the LPP layer 414. If desired, an additional protective layer can be provided. Such polarizers can be conveniently fabricated on an image sensor, and sensor-image pixels can be associated with respective pattern elements such as retarders or polarizers defined by patterned LPP/LCP layers. Pattern elements can be aligned based on lithographic mask alignment as the layers are defined on the sensor. Polarization extinction ratios of at least 2:1, 5:1, 10:1, 20:1, 50:1, 100:1, or greater are preferred in most applications.

Example 2

Polarized Fluorescent Sources

In another example, an LPP aligned LCP can be provided with one or more suitable fluorescent dyes as guest materials. Some examples of suitable fluorescent molecules are benzothiadiazole-based fluorescent dichroic dyes (BTD dyes) as shown below in Formulas 1A-1B. A perylene based dye (N,N'-di(pentyl)-perylene-3,4,9,10 tetracarboxylic diimide as shown in Formula 1C can also be used. This perylene-based dye is also an organic semiconductor and is discussed in other examples below.

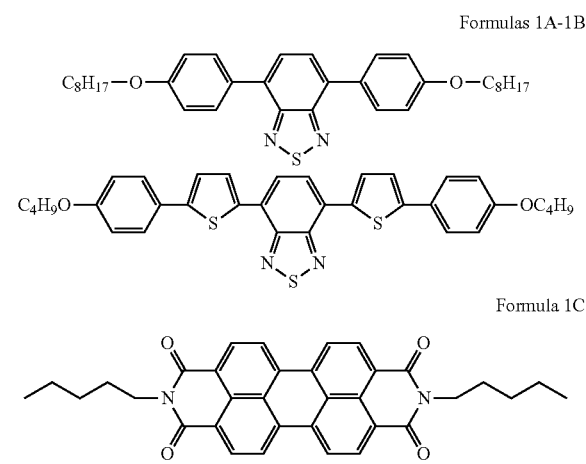

Formulas 1A-1B

Formula 1C

Synthesis of these dyes is described in Koge at al., Chem. Phys. Lett. 354:173 (2002), which is incorporated herein by reference. In this example, an LCP material (RMM141C, available from EMD Chemicals) is added as a dry powder to chloroform ($CHCl_3$) at a 15% weight-to-weight (w/w) ratio. The chloroform host solvent provides superior dye solubility for the selected fluorescent dyes which were added to the prepared $LCP/CHCl_3$ solution at concentrations varying from 0.1 to 10 mg/ml. Glass substrates (1.5 inch diameter glass wafers) were first spin-coated with an LPP material (Hayashibara LIA-01) at 2000 rpm for 30 seconds and then baked at 95° C. for two minutes. The LPP-coated substrates were then exposed with linearly polarized ultraviolet radiation (LPUV) for 30 seconds at 0° or other selected angle with a deuterium fiber-optic lamp. A dark field chrome mask was then placed in contact with the substrate. The substrate/mask assembly was rotated 90°, and a second exposure was performed for 180 seconds, resulting in a pattern with orthogonal alignment areas. The LCP/CHCl$_3$/dye mixture was spin-coated onto the oriented LPP layers on the substrates at 1000 rpm for 30 seconds and baked at 55° C. for two minutes. As the solvent evaporated, the LCP/dye mixture aligned to the LPP pattern in a nematic liquid-crystal phase. The substrate was then exposed to unpolarized UV light with a 100 mW/cm$^2$ intensity for one minute to crosslink the LCP material, resulting in a durable thin film.

By incorporating a fluorescent dye as a guest material, the fluorescent dye aligns with the liquid crystal in the LCP based on the orientation produced in the LPP by prior LPUV exposure. Exposure of the aligned fluorophore/TCP guest-host mixture to optical radiation at wavelengths suitable to produce fluorescence from the fluorophores produces substantially polarized fluorescence. Emission intensity can be increased by increasing dye concentration, without reducing the extent of polarization of the fluorescence. Results obtained with each of the above dyes are summarized in the following table. VV/HH and V/H are vertical to horizontal emission ratios with and without an analyzer, respectively, and QE is quantum yield provided for bulk dye and as incorporated into the LCP layer.

Dye Comparison

| Dye (Formula) | Peak Wavelength (nm) | | Emission Ratio | | Bulk QE | Film QE 405 nm Exc |
|---|---|---|---|---|---|---|
| | Emission | Excitation | VV/HH | V/HH | | |
| 1A | 524 | 430 | 38.4 | 12.6 | $0.69^6$ | 0.7 |
| 1B | 626 | 526 | 66.4 | 15.6 | $0.39^6$ | 0.1 |
| 1C | 548 | 500 | 19.6 | 10 | $>0.83^9$ | 0.3 |

In fluorophores in which UV absorption is polarization dependent as well, an incident UV flux used to excite fluorescence is at least partially polarized after exiting the fluorophore guest-host layer. This polarized UV can be directed through an additional λ/4 retarder layer to a reflective layer. The flux from the fluorophore layer is then reflected back to the fluorophore layer through the λ/4 retarder so as be in a state of polarization that is effectively absorbed by the fluorophore to increase fluorescence intensity.

Figure 10:
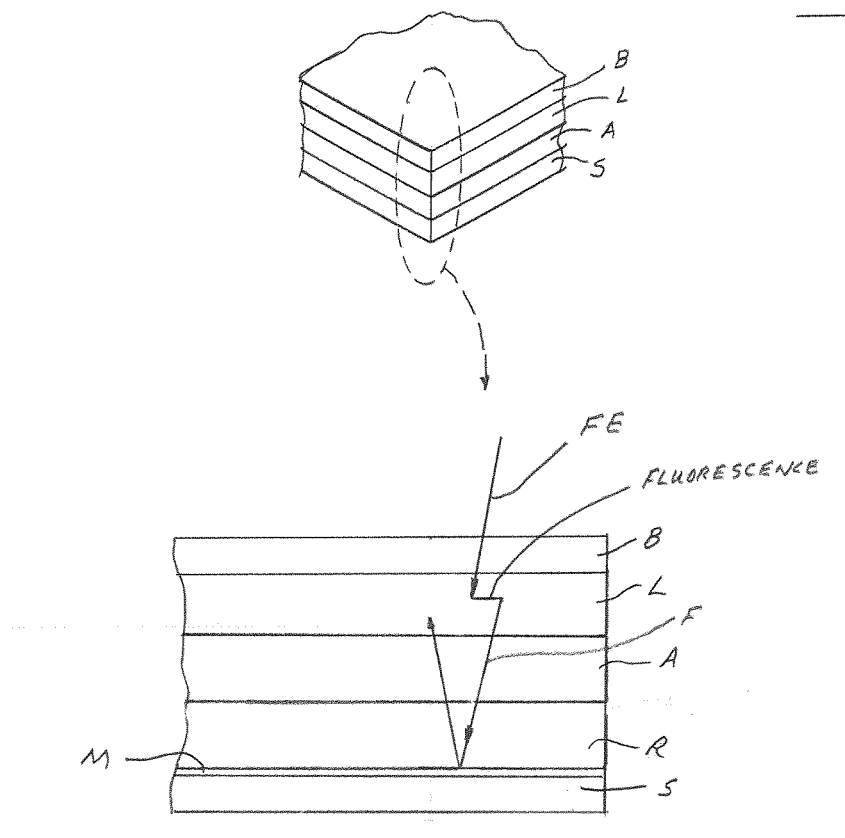
FIG. 10 is a schematic depiction of a region of a polarized light emitter.

FIG. 10 schematically depicts a polarized emitter according to an example configuration. The depicted emitter comprises a substrate S having a reflective surface M. On the substrate is a "stack" of the following layers: a retarder R, an alignment layer A in which the PPNs have a selected orientation, a LCP layer L in which liquid crystal polymers and guest material(s) (fluorophores) are aligned to the alignment layer A. Protecting these layers is a barrier layer B. The depicted structure is one in which production of fluorescent light by the fluorophores is caused by incoming fluorescence-exciting radiation FE. In the liquid crystal polymer layer L, the radiation FE stimulates production of fluorescent light F, which propagates through the retarder R and reflects from the surface M. In this configuration a portion of the incident fluorescence-exciting radiation FE can be transmitted by the LCP layer L to the retarder R and reflective surface M that drive the portion back to the LCP layer L so as to be in a state of polarization that is effectively absorbed by the co-aligned fluorophores.

Example 3

Carbon Nanotube (CNT) Micropolarizers

CNTs can also be provided as a guest material in an LCP and aligned using an LPP layer as shown in the structures above. For example, LCPs based on poly (p-phenylene terephthalamide), with the general structure as shown in Formulas 4A-4C below, having alkyl groups and a pyrene group, can be used. Single-walled carbon nanotubes (SWCNT) were purchased (Swan Chemical, Lyndhurst, N.J.) as a dry powder. A SWCNT/LPP mixture was made by dissolving 0.5 g of LCP in cyclopentanone by slightly heating and stirring at 50° C. for 1 h. followed by adding 5 mg of SWCNTs. The LC/SWCNT mixture was sonicated for 5-6 hours leading to uniform dispersion of SWCNTs. The resulting mixture was spin-coated on patterned glass substrates producing aligned films of SWCNTs exhibiting polarizing properties.

Example 4

Oriented Semiconducting Molecules

Organic semiconductors can also be provided as guest materials in an LCP for use in structures such as those shown above. For example, N,N'-di(pentyl) perylene-3,4,9,10 tetra-carboxylic diimide (PTCDI), an n-type organic semiconducting molecule shown in Formula 3 below, was synthesized using standard techniques based on the condensation of perylene-3,4,9,10-tetracarboxylic dianhydride with pentyl amine in presence of imidazole. A 1 mg/ml solution PTCDI in CHCl$_3$ was prepared by sonicating and heating the mixture at 60° C. Once a homogeneous solution was obtained, 1 ml of this solution was mixed with 1 ml of 15 wt % solution of LCP RMM141C in CHCl$_3$. This mixture was then spin-coated onto patterned substrates producing uniform films exhibiting polarized yellow emission. The PTCDI molecules have a strong tendency to aggregate, but when provided as a guest in an LCP, the PTCDI/LCP films have optical properties similar to those in homogeneous solution, suggesting almost no aggregation. This method opens new avenues to uniformly align other dichroic semiconducting molecules for application in polarized OLED applications.

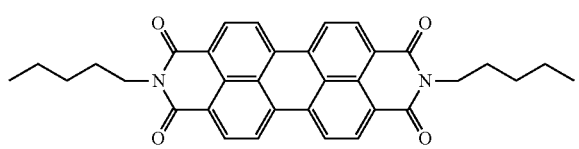

Formula 3

-continued

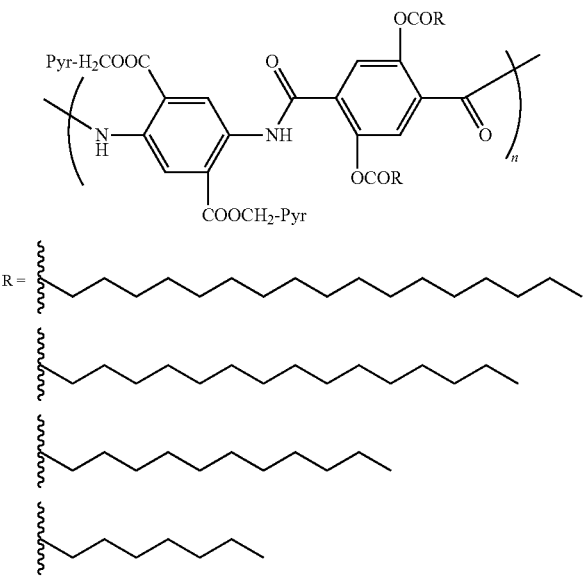

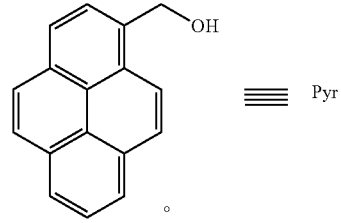

Formulas 4A-4C

Example 5

Multiple Layer Fabrication

Multiple layers of PPN/LCP combinations can be coated successively to generate different optical elements such as color filters and elliptical or circular polarizers. The successive layers can include or omit other materials mixed in with the liquid-crystal polymer, such as dichroic dyes, fluorescent dyes, or CNTs. An example process for a 3-layer circular retarder includes formation of a 0-degree aligned LPP layer that is then coated with a quarter-wave optical thickness of an LCP. Some oriented LPP layers provide considerable birefringence, and the LCP layer can be selected in consideration of the retardation provide by the LCP layer. A second LPP layer is then coated onto the quarter-wave LCP layer, and aligned at 45 degrees with respect to the 0-degree LPP layer. The second LPP layer is coated with an LCP material mixed with a dichroic dye "guest" material, forming a 45 degree linear polarizer. A third layer of LPP is coated and aligned at 90 degrees. The third LPP layer is coated with an LCP that provides a quarter-wave retardation. This 3 layer structure (quarter-wave retarder/linear polarizer at 45 degrees/quarter-wave retarder) forms a left-handed circular polarizer, and can be referred to as a homogeneous circular polarizer.

Example 6

Additional Materials

While some examples are described with reference to particular materials such as fluorophores, dyes, or n- and p-type organic semiconductors, other materials such as those described below are generally suitable.

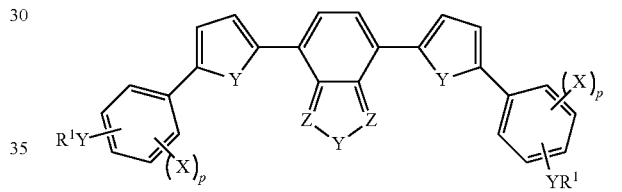

Formula 5A

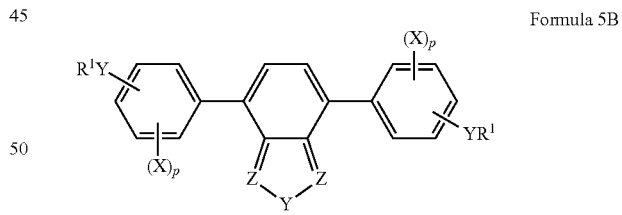

Formula 5B

With reference to Formulas 5A and 5B, each Y independently may be selected from oxygen, sulfur, and $NR^4$, wherein $R^4$ may be selected from hydrogen, aliphatic, aryl, heteroaryl, and heteroaliphatic. Each $R^1$ may be selected from aliphatic and aryl; more typically alkyl (cyclic and acyclic), alkenyl (cyclic and acyclic), and alkynyl; even more typically $C_1$-$C_{10}$alkyl, $C_1$-$C_{10}$alkenyl, $C_1$-$C_{10}$alkynyl. In preferred embodiments, Formula 1A encompasses embodiments wherein $R^1$ is $C_8$alkyl; and Formula 1B encompasses embodiments wherein $R^1$ is $C_4$alkyl. X may be a halogen, selected from bromine, chlorine, fluorine, and iodine, and p may range from 0 to about 4. Particular disclosed embodiments have Formulas 5C and 5D, illustrated below.

Formula 5C

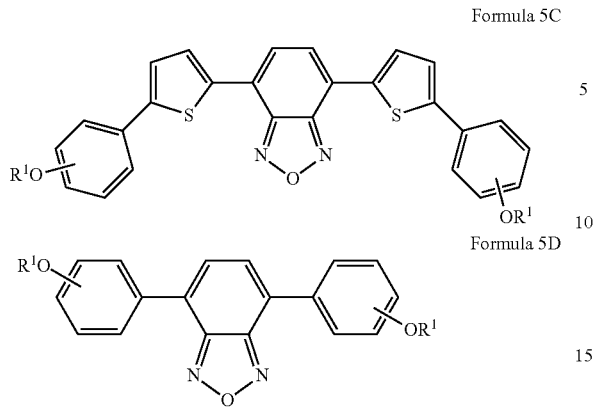

Formula 6A

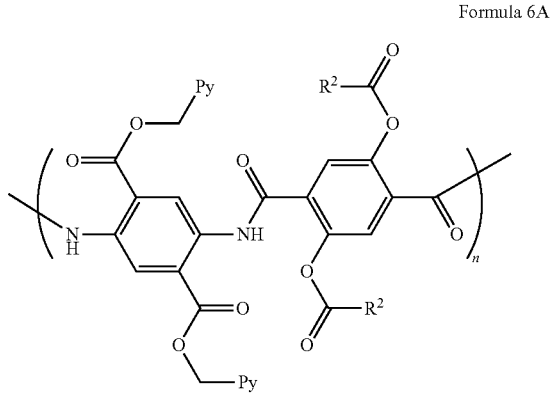

Formula 5D

Formula 6

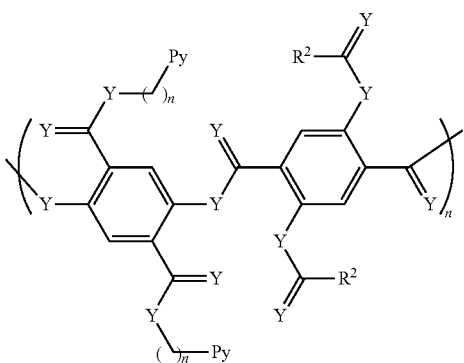

Formula 7

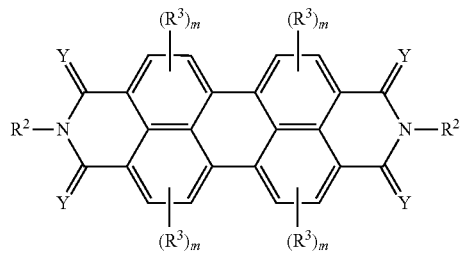

With reference to Formula 6, each Y independently may be selected from oxygen, sulfur, and $NR^4$, wherein $R^4$ may be selected from hydrogen, aliphatic, aryl, heteroaryl, and heteroaliphatic. $R^2$ may be selected from alkyl (cyclic or acyclic), alkenyl (cyclic or acyclic), alkynyl, and any one of $R^2$ may be substituted, wherein 1 to 3 hydrogen atoms is replaced with a group selected from alkyl (cyclic or acyclic), aryl, alkenyl (cyclic or acyclic), and alkynyl. $R^2$ may be selected from $C_1$-$C_{20}$alkyl; $C_1$-$C_{20}$alkenyl; $C_1$-$C_{20}$alkynyl. More typically, $R^2$ is selected from $C_5$-$C_{17}$alkyl, $C_5$-$C_{17}$alkenyl, $C_5$-$C_{17}$alkynyl. In particular disclosed embodiments, $R^2$ is $C_{17}$alkyl, $C_{15}$alkyl, $C_{11}$alkyl, $C_7$alkyl, or $C_5$alkyl. Also according to Formula 6, n ranges from 0 to about 10; more typically from 1 to about 5; and each Py independently may be selected from pyrene or pyrene substituted with one or more halogen atoms (selected from chlorine, fluorine, bromine, or iodine), alkyl groups, alkenyl groups, alkynyl groups, and heteroalkyl groups. In particular disclosed embodiments, Py is:

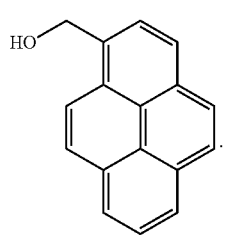 [SMILES: OCc1ccc2ccc3cccc4ccc1c2c34]

Particular disclosed embodiments have a Formula 6A, illustrated below.

With reference to Formula 7, each Y independently may be selected from oxygen, sulfur, and $NR^4$, wherein $R^4$ may be selected from hydrogen, aliphatic, aryl, heteroaryl, and heteroaliphatic. $R^2$ is as recited above; each $R^3$ independently may be selected from hydrogen, halo, aliphatic, aryl, heteroaryl, and heteroaliphatic; and m ranges from 0 to about 2. Particular disclosed embodiments have a Formula 7A, illustrated below.

7A

Example 7

Representative Synthesis 4,7-dibromo-2,1,3-benzothiadiazole and tetrakis(triphenylphosphine)palladium were obtained from TCI America, 4-octyloxyphenylboronic acid and 4-butoxyphenylboronic acid were prepared from the corresponding p-alkoxyarylbromides (all obtained from TCI America) by lithiation and quenching with trimethylborate (>97%, TCI), 4,7-bis(5-bromothien-2-yl)-2,1,3-benzothiadiazole was prepared by palladium-mediated coupling reactions according to literature procedures, perylene-3,4,9,10-tetracarboxylic dianhydride, amylamine, imidazole were purchased from Sigma Aldrich.

4,7-Bis(p-octyloxyphenyl)benzo-2,1,3-thiadiazoles

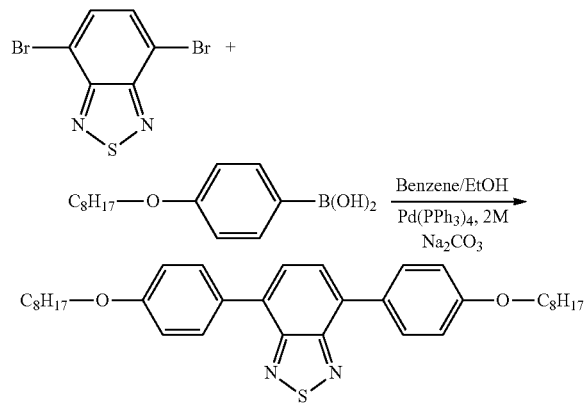

4,7-Bis(p-octyloxyphenyl)benzo-2,1,3-thiadiazoles was prepared from 4,7-dibromo-2,1,3-benzothiadiazole (1) and 4-octyloxyphenylboronic acid (2). To a mixture of 1(1.18 g, 4.0 mmol) and tetrakis(triphenylphosphine)palladium Pd(PPh$_3$)$_4$ (485 mg, 0.42 mmol) in toluene (100 ml) was added a solution of 4-octyloxyphenylboronic acid (2.50 g, 10.0 mmol) in ethanol (20 ml) and aqueous 2 M sodium carbonate solution (50 ml) at 60° C. under an argon atmosphere. After the mixture was heated for 24 h at 85° C., the reaction mixture was poured into water (200 ml) and extracted with toluene (200 ml×3). The organic layer was washed with brine (100 ml×2), dried over anhydrous magnesium sulfate, and evaporated in vacuum to dryness. The residue was purified by chromatography on silica gel (WAKO C-300, eluent: toluene) and recrystallized from chloroform/n-hexane to give 4,7-Bis(p-octyloxyphenyl)benzo-2,1,3-thiadiazoles in 66% yield (1.44 g, 2.6 mmol) as yellow needles, mp: 152-153° C., IR (KBr) 2922, 2854, 1606, 1517, 1474, 1277, 1252, 1181, 1028, 998, 820 cm$^{-1}$. $^1$H NMR (CDCl$_3$) δ$_H$ 1.30 (t, J=7.6 Hz, 6H, CH$_3$), 1.51-1.63 (m, 20H, CH$_2$), 1.82 (tt, J=6.6, 6.9 Hz, 4H, CH$_2$), 4.05 (t, J=6.6 Hz, 4H, OCH$_2$), 7.07 (d, J=8.9 Hz, 4H), 7.12 (s, 2H, ArH), 7.91 (d, J=8.9 Hz, 4H, ArH). EI-MS 544 (M$^+$).

4,7-Bis{5-(p-butoxyphenyl)thiophen-2-yl)-2,1,3-benzothiadiazole

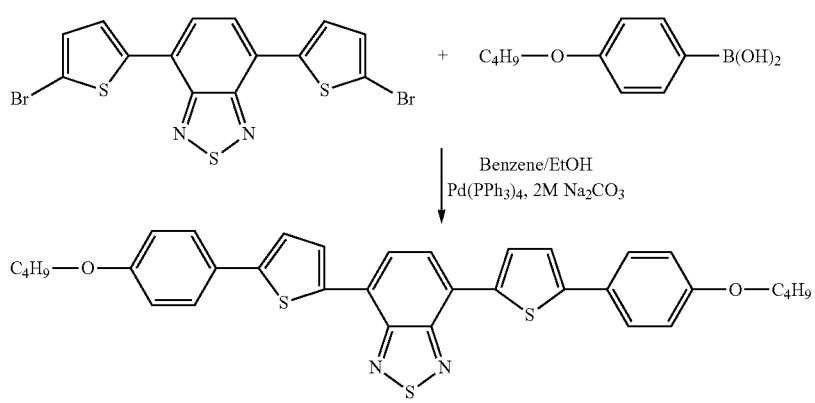

To a solution of 4,7-bis(5-bromothien-2-yl)-2,1,3-benzothiadiazole (229 mg, 0.5 mmol), tetrakis(triphenylphosphine)palladium (12 mg, 0.01 mmol) in benzene (16 ml) were added ethanol (4 ml) solution of 4-butoxyphenylboronic acid (291 mg, 1.5 mmol) and aqueous 2 M sodium carbonate solution (8 ml) at 60° C. under an argon atmosphere. After the mixture was heated at 85° C. for 12 h, the reaction mixture was poured into water (100 ml) and extracted with chloroform (30 ml×3). The organic layer was dried over anhydrous magnesium sulfate and evaporated in vacuum to dryness. The residue was purified by silica gel chromatography eluting with dichloromethane/n-hexane (1:1, v/v) to give 4,7-Bis{5-(p-butoxyphenyl)thiophen-2-yl)-2,1,3-benzothiadiazole in 81% yield as red powder. An analytical sample was obtained by recrystallization from chloroform/ethanol to give red needles: mp 330-331° C.; IR (KBr) 2963, 1604, 1535, 1507, 1482, 1450, 1278, 1251, 1179, 1067 cm$^{-1}$; $^1$H NMR (CDCl$_3$): δ 1.07 (t, J=7.3 Hz, 6H, CH$_3$), 1.82-1.86 (m, 6H, CH$_2$), 3.98 (t, J=6.6 Hz, 4H, CH$_2$), 6.95 (d, J=8.6 Hz, 4H, ArH), 7.31 (d, J=3.5 Hz, 2H, ArH), 7.63 (d, J=8.6 Hz, 4H, ArH), 7.88 (s, 2H, ArH), 8.10 (d, J=3.5 Hz, 2H, ArH); EI-MS (positive) 582 (M$^+$).

N,N'-dientyl)-perylene-3,4,9,10 tetracarboxylic diimide

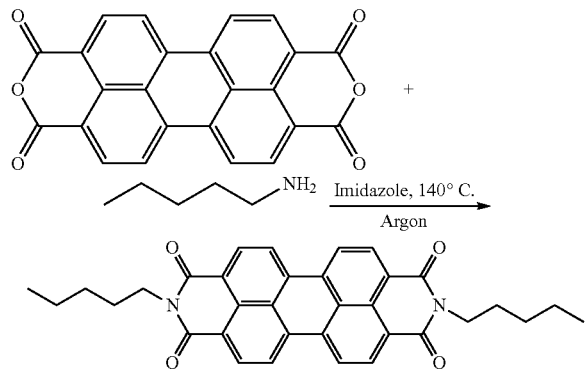

2 g (5.09 mmol) of perylene-3,4,9,10-tetracarboxylic dianhydride (PTCDA), 8 g (0.1175 mol) imidazole and 3.5 ml amylamine were placed in a three necked flask. One of the ends of the three neck flask was connected to a water condenser, Argon gas was purged into the reaction mixture using the second inlet, and the third inlet was sealed with a rubber stopper. The flask was then purged with Argon for 10 min at room temperature so as to remove all the air trapped in the system, and then immersed in the oil bath at 140° C. The reaction mixture was stirred at this temperature in the argon atmosphere. The imidazole starts melting and the reaction is initiated. The reaction mixture was kept stirring at 140° C. for 3 h to ensure the completion of the condensation reaction between the amine and the anhydride. The reaction mixture was then cooled to room temperature resulting in the solidification of the reaction mixture. Separately, 2M Hydrochloric Acid (HCl) (500 ml) and ethanol (150 ml) were mixed together and the contents of the flask were then transferred to this solution. The entire solution was allowed to stir overnight at room temperature. The resulting dark maroon colored solid was then filtered and washed thoroughly with water until the pH of the washings turned neutral. The solid was further washed with ethanol so as to remove excess amyl amines. The solid powder was then dried at 100° C. for 2 h to result give compound 1. Yield: 93%. $^1$H-NMR (CDCl3): $\delta_H$ 0.945 (t, 6H, 2CH$_3$), 1.401 (m, 8H, 18CH$_2$), 1.78 (m, 4H, 2β-CH$_2$), 4.22 (t, 4H, 2α-CH$_2$), 8.65 (m, 8H, perylene).

Dye Quantum Efficiency

Dye quantum efficiency (QE), defined as the number of emitted photons divided by the number of absorbed photons, is a function of both the excitation and emission wavelengths. A 405 nm laser diode was used for excitation, and the dye film was placed inside an integrating sphere connected to a calibrated fiber spectrometer. A coated LCP/dye sample was then placed in the center of the integrating sphere and a power spectrum was taken. Based on the power spectrum, the QE of each dye was estimated. In general, QE depends on the peak absorption of the dyes. A higher QE for dye 1A was observed than the QEs for dyes 1B and 1C, because the excitation wavelength of 405 nm is closest to the peak absorption of dye 1A.

Example 8

Patterned Waveplates

A patterned waveplate was fabricated using an LPP material (ROP-103) and an LPC material (ROF-5102) supplied by Rolic Technologies (Switzerland). An exposure system was developed to align and cure the ROP-102 and ROF-5102, respectively. A Hamamatsu LC5 UV light source was collimated and filtered (passband of 280 nm to 350 nm) and then linearly polarized using a dichroic UV polarizer. The sample with LPP layer to be oriented was placed on a rotational stage for exposure with an arbitrary UV polarization direction. UV beam intensity at the stage was 12 μW/cm². Exposure times varied based on the number of alignment directions and substrate reflectivity. The coating and alignment process for ROP-103 was: (1) spin-coat at 2500 RPM for 60 seconds, (2) 5 minute bake step at 175° C. to evaporate residual solvent, and (3) alignment exposure(s). Resulting film thicknesses were approximately 50 nm and of negligible retardance. Patterned alignment was achieved by adding a contact mask during a first exposure. The mask was then removed, the stage/substrate rotated 90°, and a second exposure performed.

ROF-5102 LCP was applied at a thickness associated with half-wave plate operation at a selected wavelength. ROF-5102 thickness and retardance were functions of spin rate. LPP coated substrates were: (1) spin-coated at 850 rpm for 2 minutes, (2) annealed at 52° C. in an oven for 3 minutes, and (3) broadband 50 mW UV-cured for 5 minutes in a nitrogen atmosphere. For half-wave plate operation at 532 nm, ROF-5102 film thickness is about 2.2 μm, and retardance was controlled to within ±5% across 1.5 diameter substrates.

Example 9

Mixed Chrome and LC Features

Figure 5:
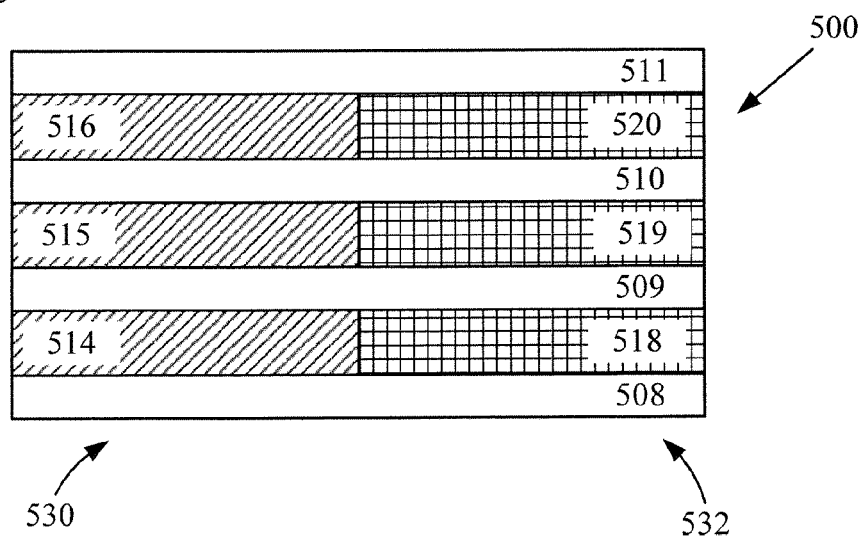
FIG. 5 illustrates a mask having mixed chrome and LPP/LCP pattern features.
Figure 6:
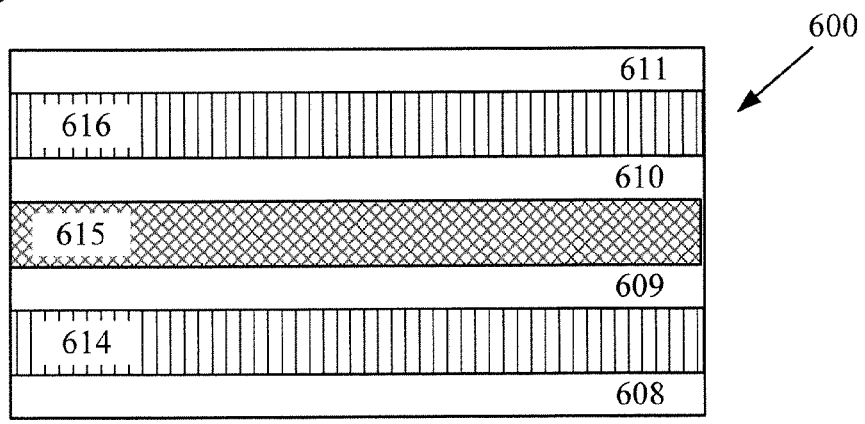
FIG. 6 illustrates an alternative mask having mixed chrome and LPP/LCP pattern features.

Substrates can also include combinations of chrome and LC features. With reference to FIG. 5, a mask 500 is formed on a substrate having a patterned chrome layer with chrome portions 508-511, a patterned LPP layer, and an LCP layer having pattern portion 514-516 and 518-520 in a first pattern area 530 and a second pattern area 532, respectively. Other combinations of chrome and LPP/LCP pattern features can be used. With reference to FIG. 6, a mask 600 includes a substrate having a patterned chrome layer with alternative pattern lines 608-611, a patterned LPP layer, and an LCP layer having alternatingly oriented pattern lines 614-616.

Example 10

Patterned LCP Polarizers

Patterned polarizers can also be fabricated using LPP/LCP layers. In this example, the LPP material was LIA-01 from Dainippon Ink and Chemical. The LCP material was RMS03-001C from Merck, delivered as a 30% (w/w) solution of propylene glycol monomethyl ether acetate (PGMEA). As noted above, the LCP is a reactive mesogen that cures under UV light. Various dichroic dyes were purchased from Hayashibara Biochemical Laboratories, Inc., and round soda lime glass substrates were used. An optical adhesive (Norland Optical Adhesive 60) was used as a barrier layer. UV exposures were made with a Hamamatsu Deuterium Fiber Optic Lamp. An intensity of 20 mW/cm² was used for exposure.

In a typical example, a 1.5" diameter soda-lime wafer was spin-coated with LPP at 2000 rpm, and dried at 95° C. for 2 minutes. The selected LPP material was rewritable; therefore the entire substrate was first exposed with LPUV for 30 seconds at 0° with the deuterium fiber-optic lamp. A dark-field Air Force Resolution chrome mask was then placed in contact with the substrate, the substrate/mask assembly was rotated 90°, and a second exposure was performed for 180 seconds, resulting in a pattern orthogonal to the first pattern. A mixture of LCP and a selected dichroic dye was spin-coated on top of the patterned LPP substrate. More uniform polarizing coatings can be produced with dichroic dyes that are readily miscible in the LC. A 10 mg/ml stock solution of a selected dichroic dye in $CHCl_3$ was prepared and mixed with an equal volume of LCP-RMS03-001C solution in PGMEA. The solution of dye and LCP in a $CHCl_3$/PGMEA mixture was then spin-coated on the aligned patterned substrate at 1000 rpm and then dried for 2 minutes at 55 C to remove residual solvent. As the solvent evaporated, the LC/dye mixture aligned to the LPP pattern in a nematic phase. The substrate was then exposed to unpolarized UV light with a 50 mW/cm$^2$ intensity for six minutes in order to cure the material, resulting in a durable thin film.

For generating multilayer elements, such as circular polarizers, two successive layers of LPP/LCP are spin-coated. The first layer is a patterned retarder (obtained by spin-coating undoped LCP), and the second layer is a uniform linear polarizer (obtained by spin-coating the mixture of dye and LCP). An optical adhesive was used as a barrier layer between the two LPP/LCP films and applied by spin-coating at 2500 rpm and UV-curing for 5 minutes at an intensity of 50 mW/cm$^2$.

Representative dyes are listed in the table below, but other dyes can be used.

| Dye No. | Visible Color | $\lambda_{max}$ in $CHCl_3$ | $\lambda_{max}$ 10 mg/mL Polarizer |
|---|---|---|---|
| G-207 | Yellow | 387 nm | 386 nm |
| G-241 | Purple | 553 nm | 599 nm |
| G-472 | Blue | 619 nm | 652 nm |

In some examples, dyes were mixed to produce a gray polarizer. A 2 µg/mL $CHCl_3$ dilution was first prepared for each dye. The dilute dyes were then mixed in various ratios, and a preferred ratio for a color neutral polarizer was estimated and measured in a spectrometer. The optimum ratio was measured to be 10 Blue:10 Yellow:2 Blue, or 5:5:1 (blue:yellow:red).

Example 11

Polarized Organic LED Emitters

Figure 7:
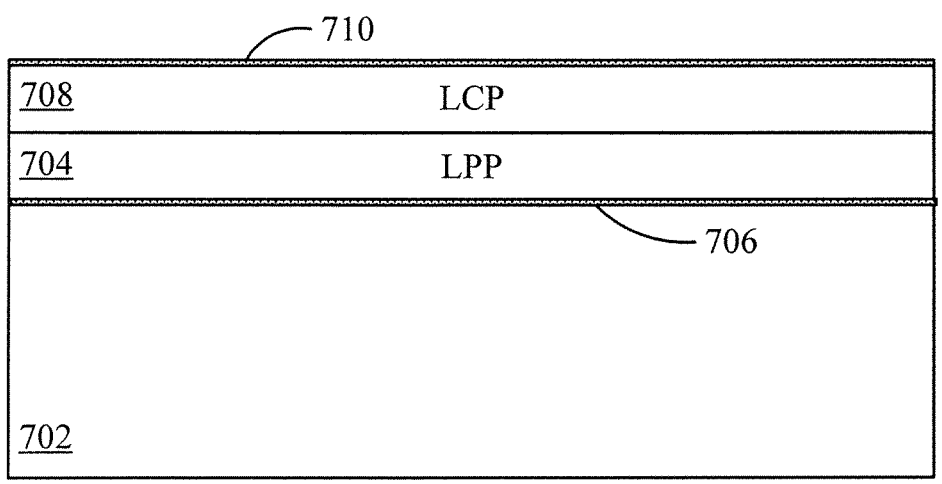
FIG. 7 illustrates features of a light emitter based on a doped LCP layer aligned with an LPP layer.

FIG. 7 illustrates features of a light emitter based on an aligned LCP layer. As shown in FIG. 7, a substrate 702 is provided with a conductor layer 706 such an opaque or transparent layer of a metal or metal oxide such as ITO. A patterned or otherwise oriented LPP layer 704 is situated on the conductor layer 706. An LCP layer 708 is situated on the conductor layer 706, and a conductor layer 710 is provided on the LCP layer 710. A suitable guest material such as an organic semiconductor material can be used in the LCP layer 708, and application of a voltage to the conductors 706, 710 can result in injection of carriers and recombination of carriers, resulting in light emission that is polarized based on alignment in the LCP layer 708. The LCP/LPP layers can be patterned as desired to produce patterned emission, and electrical connections provided so as to activate each pattern element individually. For example, row and column conductors can be provided based on conductor layers such as the layers 706, 710 to activate corresponding light emitter elements defined by the LCP and LPP layers. In some examples, first and second LCP layers with n-type and p-type organic semiconductor guests, respectively, are configured to provide a p-n junction, but single layers or other organic LED configurations can be used.

Example 12

Additional Devices and Applications

Optical sensors such as charge-coupled devices (CCD) and complementary metal-oxide semiconductor (CMOS) devices can be provided with patterned or unpatterned polarizers and/or retarders as described above. Optical filters such as conventional thin-film or absorptive filters can include one or more LCP/LPP layers that can serves as polarizers such as linear, circular, or elliptical polarizers, or retarders of arbitrary retardation such as quarter-wave or half-wave retardation. The LCP/LPP layers can be patterned or unpatterned, and multilayer structures can include different patterns on some or all layers. Representative applications include 3-dimensional displays, interferometry, optical storage, polarimeters, and polarization-sensitive cameras.

In some applications, a so-called "pixelated phase mask" comprising a patterned polarizer or retarder based on one or more LPP/LCP layers can be used for spatial phase multiplexing in interferometry. For example, a multilayer or single-layer patterned retarder can have retarder pattern elements of the same or varying retardation and with the same or common alignment. A patterned polarizer can be provided having a regular or other predetermined arrangement of polarizer elements so that orthogonal test and reference wavefronts incident to the patterned polarizer produce an interference pattern this is detected by an array detector. Typically, the patterned polarizer/retarder pattern pitch is the same or an integer multiple of the array detector pixel pitch. Uses of such pixelated phase masks are described in Brock et al., U.S. Pat. No. 7,230,717, which is incorporated herein by reference. In some examples, a pixelated phase mask includes a quarter-wave retarder and polarizing elements, or other combinations of polarizing elements and retarder elements, typically selected to produce interference between incident orthogonally polarized test and reference wavefronts.

CONCLUSION

Selected examples of the disclosed technology are described above. In other examples, devices are made by coating a layer of photo-orientable polymer network (PPN), and exposing the layer with patterns using polarized radiation. A layer of liquid-crystal polymer (LCP), mixed with one or more of a dichroic dye and/or carbon nanotubes and/or semiconductor polymers and/or fluorescent molecules, is applied to the PPN to create patterned micro-electrical and optical devices. Patterning can be carried out with optical and/or interference lithography using a scanned light source or multiple optical lithographic masks. Additional radiation exposures can be performed to cross-link selected areas of the layers, and layer materials that are not cross-linked can be subsequently removed with a solvent. LCP and PPN layers can be stacked to create multiple layer and 3D oriented structures. One or more dichroic dyes or fluorophores can be used in a single LCP layer for absorption or emission at associated wavelengths. Semiconductor polymers such as n-type, intrinsic, or p-type can be used. PPN/LCP layered devices can be formed directly on a semiconductor wafer having devices defined thereon, or directly on fabricated devices such as image sensors or displays. Other electronic devices to which PPN/LCP devices can be applied include CMOS devices, photomultipliers, avalanche photodiodes, micro-electromechanical systems, microbolometers, and superconducting devices. In some examples, PPN/LCP devices are formed on transparent substrates and then mounted to a wafer or other substrate. Barrier and planarization layers can be provided at PPN or LCP layers and substrates can be planar, non-planar, rigid, or flexible.

The disclosed methods and devices can be used applications such as polarization-sensitive imaging and active and passive displays. Because rigid substrates are not required, the disclosed devices can have flexible PPN and LCP layers, and such layers can be applied so as to conform to planar or complex three-dimensional shapes, and planar configurations are described for convenient illustration.

In view of the many possible embodiments to which the principles of the disclosed technology may be applied, it should be recognized that the illustrated embodiments are only preferred examples and should not be taken as limiting in scope. We therefore claim all that comes within the scope and spirit of the appended claims.

We claim:

1. A method, comprising:
   on a substrate surface, providing a first alignment layer for liquid crystal alignment, the first alignment layer defining at least one respective alignment direction, wherein the first alignment layer comprises a respective photo-orientable polymer network (PPN);
   forming a first liquid crystal polymer (LCP) layer proximate the first alignment layer so that liquid crystal material of the first liquid crystal polymer layer is aligned with respect to the at least one alignment direction, wherein the first liquid crystal polymer includes at least a first guest material that aligns with the liquid crystal material, and wherein the first guest material comprises a fluorescent dye, an organic semiconductor, an anisotropic nanocrystal, a nucleic acid, a protein, or carbon nanotubes;
   forming a first barrier layer on the first LCP layer;
   providing a second alignment layer proximate the first barrier layer, the second alignment layer defining at least one respective alignment direction and comprising a respective PPN;
   forming a second LCP layer proximate the second alignment layer so that liquid crystal material of the second LCP layer is aligned with the at least one alignment direction of the second LCP, wherein the second LCP layer includes a second guest material that aligns with the liquid crystal material of the second LCP layer; and
   forming a second barrier layer on the second LCP layer.

2. The method of claim 1, further comprising:
   patterning the PPN of the first alignment layer, as provided on the substrate surface; and
   patterning the first LCP layer according to the patterned PPN.

3. The method of claim 2, wherein patterning the PPN of the first alignment layer comprises selectively exposing the PPN to patterned linearly polarized ultraviolet radiation.

4. The method of claim 3, wherein the linearly polarized ultraviolet radiation is patterned according to a correspondingly patterned mask.

5. The method of claim 1, wherein the first guest material of the first liquid crystal polymer layer comprises a plurality of fluorescent dyes selected to provide a color-neutral fluorescence.

6. The method of claim 1, further comprising establishing the at least one alignment direction in the first alignment layer by exposing the PPN to linearly polarized ultraviolet radiation.

7. The method of claim 1, further comprising: patterning the PPN of the first alignment layer by exposing the first alignment layer to correspondingly patterned linearly polarized ultraviolet radiation, and
   removing portions of the PPN that are not exposed to the patterned linearly polarized ultraviolet radiation.

8. A light-polarizing device, comprising:
   a substrate;
   a first group of polarizing layers on the substrate, the first group of polarizing layers comprising a first alignment layer, a first liquid crystal polymer layer, and a first barrier layer, the first alignment layer defining at least one respective alignment direction and a respective oriented photo-orientable polymer network (PPN);
   the first liquid crystal polymer (LCP) layer comprising a respective liquid crystal material and a respective anisotropic guest material aligned with the alignment direction(s);
   a second group of polarizing layers on the first barrier layer, the second group of polarizing layers comprising a second alignment layer, a second LCP layer, and a second barrier layer;
   the second LCP layer comprising a respective LCP material and a respective anisotropic guest material aligned with the second alignment layer; and
   the first barrier layer being situated between the second layer group and the first LCP layer.

9. The device of claim 8, further comprising a plurality of fluorophores situated in the first LCP layer.

10. The device of claim 8, further comprising a waveplate.

11. The device of claim 8, wherein the substrate is a flexible substrate.

12. The device of claim 8, wherein:
    the substrate comprises an array of electronic devices formed thereon according to a pattern; and
    the first group of polarizing layers being situated on selected regions of the substrate according to the pattern.

13. The method of claim 1, wherein the first and second alignment layers define the respective first and second alignment directions by respective exposures to polarized light of respective polarization directions.

14. The method of claim 1, wherein at least one of the first and second guest materials is a fluorescent material.

15. The method of claim 1, wherein at least one of the first and second guest materials comprises carbon nanotubes.

16. The device of claim 8, wherein the first and second groups of polarizing layers impart different respective polarizations to light incident on the light-polarizing device.

17. The device of claim 16, wherein the different respective polarizations include at least one of linear polarization, elliptical polarization, and circular polarization.

18. The device of claim 8, wherein at least one of the anisotropic guest materials comprises a fluorophoric material or carbon nanotubes.

19. The device of claim 8, further comprising a waveplate.

20. The device of claim 8, wherein:
    the substrate comprises a patterned array of sensor elements; and
    the first group of polarizing layers is patterned according to the patterned array.

21. The device of claim 8, wherein:
    the substrate comprises a patterned array of sensor elements; and the first group of polarizing layers comprises a first alignment layer, a first liquid crystal polymer layer, and a first barrier layer, the first alignment layer defining at least one respective alignment direction and a respective oriented photo-orientable polymer network (PPN) layer; and the second group of polarizing layers is patterned according to the pattern of the first group.

22. A polarized-light emitter, comprising:
a substrate;
a retarder situated relative to the substrate; and
a first group of polarizing layers supported by the substrate and comprising a respective alignment layer, a respective liquid-crystal polymer (LCP) layer, and a respective barrier layer, the LCP layer comprising an LCP material and molecules of at least one anisotropic fluorophore, the LCP material and molecules of the fluorophores being aligned with the alignment layer, the molecules of the fluorophores being sensitive to fluorescence-excitation energy which causes the molecules of the fluorophore to produce fluorescent light of which at least a portion is transmitted through the liquid crystal polymer layer, the alignment layer, and the retarder, the liquid crystal polymer layer being transmissive to at least a portion of the fluorescent light such that the portion transmits through the liquid crystal polymer layer to a reflector that directs the portion back to the liquid crystal polymer layer in which the fluorescent light is in a polarization state that is effectively absorbed by the oriented fluorophores.

23. The polarized-light emitter of claim 22, further comprising a source of fluorescence excitation energy situated and configured to produce the fluorescence-excitation energy that induces fluorescence by the fluorophore.

24. The polarized-light emitter of claim 23, wherein the excitation energy is electrical energy.

25. The polarized-light emitter of claim 24, configured as a respective portion of an organic LED.

26. The polarized-light emitter of claim 23, wherein the excitation energy is ultraviolet light.

27. The polarized-light emitter of claim 26, wherein a portion of the ultraviolet excitation light is transmitted by the LCP layer to a retarder and reflector that direct the portion back to the LCP layer so as to be in a state of polarization that is effectively absorbed by the oriented fluorophores.

28. The polarized-light emitter of claim 27, wherein the retarder is a λ/4 retarder for the incident excitation light.

29. The polarized-light emitter of claim 28, wherein:
the LCP layer has at least first and second liquid-crystal orientation directions in corresponding patterned areas, and
the oriented fluorophores are aligned with respect to the first and second liquid-crystal orientation directions in the corresponding pattern areas.

30. The polarized-light emitter of claim 22, further comprising a waveplate.

31. A polarized-light emitter, comprising:
a substrate;
a first group of polarizing layers supported by the substrate and comprising a respective alignment layer, a respective liquid-crystal polymer (LCP) layer, and a respective barrier layer, the LCP layer comprising an LCP material and molecules of at least one anisotropic fluorophore, the LCP material and molecules of the fluorophores being aligned with the alignment layer; and a second group of polarizing layers on the barrier layer of the first group of polarizing layers, the second group of polarizing layers comprising a respective alignment layer, a respective LCP layer, and a respective barrier layer, the LCP layer comprising an LCP material and comprising molecules of at least one anisotropic fluorophore, the LCP material and molecules of the fluorophore being aligned with the respective alignment layer.

32. The polarized-light emitter of claim 22, wherein the first group of polarizing layers is patterned according to the array so as to provide multiple pixels with respective individual units of the first group.

33. The polarized-light emitter of claim 32, wherein the pixels are configured as respective organic LEDs.

34. A polarized-light emitter, comprising:
a substrate; and
a first group of polarizing layers supported by the substrate and comprising a respective alignment layer, a respective liquid-crystal polymer (LCP) layer, and a respective barrier layer, the LCP layer comprising an LCP material and molecules of at least one anisotropic fluorophore, the LCP material and molecules of the fluorophores being permanently aligned with the alignment layer.

35. The method of claim 1, wherein forming the first alignment layer, the first LCP layer, and the first barrier layer results in formation of a first layer group, and forming the second alignment layer, the second LCP layer, and the second barrier layer results in formation of a second layer group, the method further comprising forming at least a third layer group relative to the first and second layer groups.

36. The light-polarizing device of claim 8, further comprising at least a third layer group situated relative to the first and second layer groups.

37. The polarized light emitter of claim 34, further comprising at least a second group of polarizing layers supported by the substrate and the first group.

38. The polarized-light emitter of claim 22, further comprising at least a second group of polarizing layers supported by the substrate and the first group.

39. The polarized-light emitter of claim 31, further comprising at least a third group of polarizing layers situated relative to the first and second layer groups.

40. The polarized-light emitter of claim 34, wherein a portion of the ultraviolet excitation light is transmitted by the liquid crystal polymer layer to a retarder and reflector that direct the portion back to the liquid crystal polymer layer so as to be in a state of polarization that is effectively absorbed by the oriented fluorophores.

41. The polarized-light emitter of claim 40, wherein the retarder is a λ/4 retarder for the excitation light flux.

42. The method of claim 22, wherein the liquid crystal polymer layer has at least first and second liquid crystal orientation directions in corresponding patterned areas, wherein the oriented fluorophores are aligned with respect to the first and second liquid crystal orientation directions in the corresponding pattern areas.

* * * * *